United States Patent Office 3,824,236
Patented July 16, 1974

3,824,236
BRIGHTENERS
Alfons Dorlars and Otto Neuner, Leverkusen, Germany, assignors to Bayer Aktiengesellschaft, Leverkusen, Germany
No Drawing. Filed June 28, 1971, Ser. No. 157,614
Claims priority, application Germany, June 30, 1970,
P 20 32 172.6
Int. Cl. C07d 55/02
U.S. Cl. 260—240 C                              8 Claims

ABSTRACT OF THE DISCLOSURE

Stilbene compounds of the formula

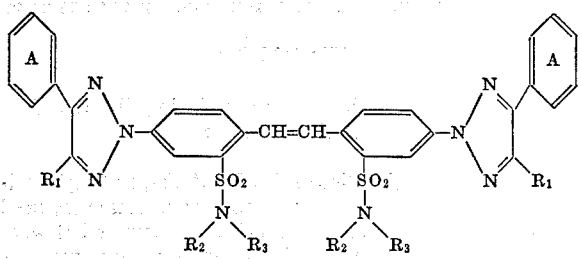

in which $R_1$ represents hydrogen, alkyl, aralkyl or aryl,
$R_2$ denotes hydrogen, alkyl or aralkyl,
$R_3$ represents substituted alkyl radical,
$R_2$ and $R_3$ together with the N atom form a non-aromatic heterocyclic ring, and
the phenyl radicals A optionally carry further substituents, as well as their preparation and their use as optical brighteners

---

The subject of the present invention are stilbene compounds of the formula

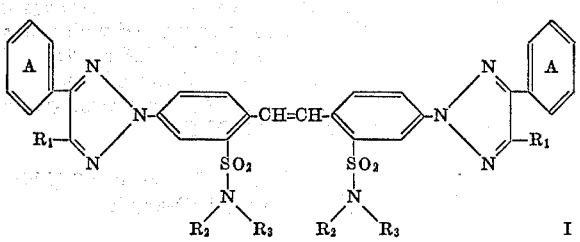

in which $R_1$ represents hydrogen, alkyl, aralkyl or aryl,
$R_2$ denotes hydrogen, alkyl or aralkyl,
$R_3$ represents substituted alkyl radical,
$R_2$ and $R_3$ together with the N atom form a non-aromatic heterocyclic ring, and
the phenyl radicals A optionally carry further substituents, as well as their manufacture and use as optical brighteners.

By the abovementioned alkyl radicals $R_1$, $R_2$ and $R_3$, there are especially to be understood those with 1 to 4 C atoms, which are optionally substituted by hydroxyl, $C_1$–$C_4$-alkoxy or acyloxy groups.

Possible acyloxy groups are preferably alkylcarbonyloxy groups with 2 to 5 C atoms, which can be substituted in the alkyl radical by hydroxyl, carboxyl, $C_1$–$C_4$-alkoxy or $C_2$–$C_5$-carbalkoxy groups.

Suitable alkyl radicals $R_1$ and $R_2$ are methyl, ethyl, n- and i-propyl, and n-, i- and t-butyl radicals. Further suitable alkyl radicals $R_1$, $R_2$ and $R_3$ are: β-hydroxyethyl, β-methoxyethyl, β-ethoxyethyl, β-propoxyethyl, β-isopropoxyethyl, β-butoxyethyl, β-hydroxypropyl, β-methoxy- propyl and β-ethoxypropyl, β-propoxypropyl and β-butoxypropyl, γ-hydroxypropyl, γ-methoxypropyl and γ-ethoxypropyl, γ-propoxypropyl and γ-butoxypropyl, β- and γ-hydroxybutyl, β- and γ-methoxybutyl and ethoxybutyl, and β- and γ-propoxybutyl and -butoxybutyl.

A suitable aralkyl radical $R_1$ and $R_2$ is especially the benzyl radical.

Suitable aryl radicals $R_1$ are especially phenyl radicals which are optionally substituted by halogen, $C_1$–$C_4$-alkyl and $C_1$–$C_4$-alkoxy radicals, such as phenyl, p-fluorophenyl, p-tolyl, m-tolyl, p- and m-ethylphenyl, p-propylphenyl, p-isopropylphenyl and p-butylphenyl radicals, as well as p-methoxyphenyl and p-ethoxyphenyl radicals.

Suitable substituents which the phenyl radicals A can carry preferably in the m- or p-position are halogen atoms, such as fluorine, chlorine and bromine, as well as nitrile, $C_1$–$C_4$-alkyl and $C_1$–$C_4$-alkoxy groups.

Suitable heterocyclic radicals which $R_2$ and $R_3$ can form together with the N atom are morpholine radicals optionally substituted by alkyl groups. As examples thereof, there may be mentioned: morpholine, 2-methylmorpholine, 2,6-dimethylmorpholine, 2,6-diethylmorpholine and 2-ethylmorpholine.

Within the framework of the compounds of the formula I, those of the formula

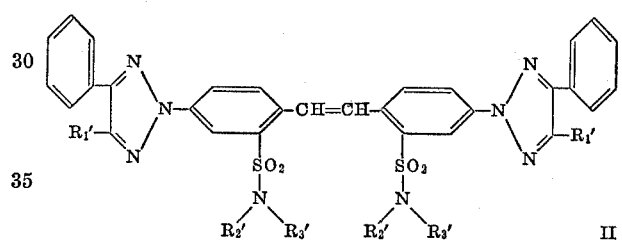

are preferred, wherein $R_1'$ represents hydrogen, an alkyl radical optionally substituted by hydroxyl, alkoxy or alkylcarbonyloxy groups, a benzyl radical or a phenyl radical which is optionally substituted by halogen or by alkyl or alkoxy groups,
$R_2'$ denotes hydrogen, an alkyl radical which is optionally substituted by hydroxyl, alkoxy or alkylcarbonyloxy groups, or a benzyl radical,
$R_3'$ represents an alkyl radical which is substituted by hydroxyl, alkoxy or alkylcarbonyloxy groups, and
$R_2'$ and $R_3'$ together with the N atom form a morpholine radical which is optionally substituted by alkyl radicals, and wherein alkyl and alkoxy radicals are to be understood as radicals of this nature which have 1 to 4 C atoms.

Particularly preferred stilbene compounds are those of the formula

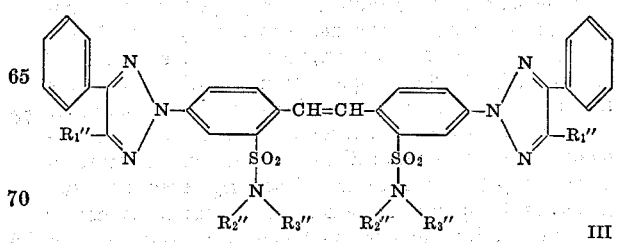

in which

R₁″ represents hydrogen, methyl or ethyl,
R₂″ denotes hydrogen, methyl, ethyl, n-propyl, n- and i-butyl, hydroxyethyl and methoxyethyl,
R₃″ denotes hydroxyethyl or methoxyethyl, and
R₂″ and R₃″ together with the N-atom can form a morpholine or 2,6-dimethylmorpholine radical.

The new stilbene compounds of the formula I are obby reacting sulphonic acid halides of the formula

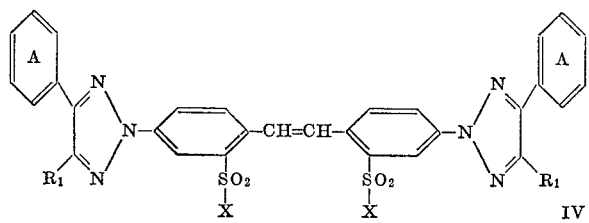

in which

A and R₁ have the abovementioned meaning and
X represents halogen, with amines of the formula

in which R₂ and R₃ have the abovementioned meaning, in the presence of an acid acceptor.

The sulphonic acid halides of the formula II, in which X preferably represents chlorine, are in part known (compare German Patent Specification 1,279,636). These compounds are obtained from the corresponding sulphonic acids by the method indicated in the abovementioned patent specification.

Suitable acid acceptors for the reaction according to the invention are: alkali hydroxides, alkali carbonates, alkali bicarbonates and tertiary amines. It is however particularly advantageous to employ the amine (V), used as a reactant, in excess.

The reaction of the sulphonic acid halides (IV) with the amines (V) is preferably carried out in an aqueous, aqueous-organic or purely organic medium. Possible organic solvents for this purpose are especially aromatic hydrocarbons and chlorinated hydrocarbons, such as benzene, toluene, xylene, tetralin, chlorobenzene and o-dichlorobenzene.

The new brighteners of the formula I are suitable for brightening synthetic polymers, especially polyesters, synthetic polyamides, polycarbonates, polyester-urethanes, polyvinyl chloride and cellulose acetates, and are preferably added to the polymers before shaping.

In the case of the manufacture of polyesters, for example from terephthalic acid and ethylene glycol or 1,4-dimethylolcyclohexane, the brighteners of the formula I can be added to the components either before or during the trans-esterification or esterification; further additives can also be used simultaneously, for example white pigments, such as titanium dioxide for the manufacture of delustred polyester materials. The brightened polyester melts can be spun into filaments in the usual manner or be converted into films or mouldings in the usual manner.

The amounts required can be easily determined by preliminary experiments; they are approximately in the range of 0.01–0.2%, relative to the material to be brightened.

The brighteners of the formula I are distinguished by a series of valuable properties. Thus they barely change the melt viscosities of polyester spinning compositions; they are further more stable to the metal catalysts present in the transesterification, and display excellent fastness to sublimation. The brightened polyester filaments, and the fabrics manufactured therefrom, furthermore display excellent fastness to washing and to chlorine. Compared to the nearest comparable bistriazolylstilbene-disulphonamides, described in German Patent Specification 1,279,636, the brighteners of the formula I are distinguished by certain better technical properties in use, such as, for example, a higher degree of whiteness and better fastness to light of the brightened polyester spinning compositions.

EXAMPLE 1

(A)₁: 4,4′-bis-[4-phenyl-v-triazolyl-(2)]-tilbene-2,2′-disulphochloride 671 g. of the di-sodium salt of 4,4′-bis-[4-phenyl-v-triazolyl-(2)]-stilbene-2,2′-disulphonic acid (manufactured according to German Patent 1,279,636, Example 2a) were introduced into a mixture of 3 litres of phosphorus oxychloride and 460 g. of phosphorus pentachloride (manufactured in situ by passing 156 g. of chlorine gas into 308 g. of phosphorus trichloride) whilst stirring. Thereafter the yellow suspension was gradually heated until the phosphorus oxychloride boiled, and stirred for a further 4 hours at this temperature (109° C.). After cooling to room temperature, the phsphorus oxychloride was removed from the precipitated material by filtration, and the material was pressed out on the filter. After working up by distillation, the phosphorus oxychloride filtrate can be reused. The crude yellow disulphochloride which has been filtered off, and still contains sodium chloride, was purified by introducing it into 5 litres of water at 50–60° C. whilst stirring; after stirring for half an hour, it was again filtered off, and the filter residue was washed with warm water until free of acid and finally dried. 626 g. (94% of theory) of disulphochloride (a) were obtained in the form of a yellow crystal powder, which after recrystallisation from o-dichlorobenzene melts at 299° C.

(B)₁: 4,4′-bis-[4-phenyl-v-triazolyl-(2)]-stilbene-2,2′-bis-sulpho(methyl-β-hydroxyethyl)-amide 626 g. of disulphochloride (A)₁ were stirred into 3.8 litres of chlorobenzene; 490 g. of N-methyl-ethanolamine were added thereto at room temperature. The temperature gradually rises to 65° C. (during which the yellow colour of the suspension becomes distinctly lighter). The mixture was stirred for a further 3 hours at 65° C. and subsequently allowed to cool to 30–35° C., and the crystals which had precipitated were thoroughly filtered off. The filter residue was eluted with 15 litres of hot water and was purified by recrystallisation from 4 litres of 92% strength dimethylformamide, containing water, using 20 g. of adsorbent charcoal. The bis-sulphonamide (B)₁, which after cooling crystallises out in the form of light greenish-tinged needles, was thoroughly freed of the mother liquor by filtration, washed with 1.2 litres of methanol and dried. 649 g. (92.8% of theory) of bis-sulphonamide of melting point 287–288° C. were obtained.

The sulphonamides listed in the Table which follows were obtained analogously by reaction of 4,4′-bis-[4-phenyl-v-triazolyl - (2)] - stilbene - 2,2′ - disulphochloride, or of its derivatives which are substituted in the phenyl radical, as well as of 4,4′-bis-[4-phenyl-5-methyl-, or -ethyl-, -propyl-, -isopropyl-, -butyl-, benzyl- or -phenyl-v- triazolyl-(2)]-stilbene-2,2'-disulphochloride with the particular amines indicated:

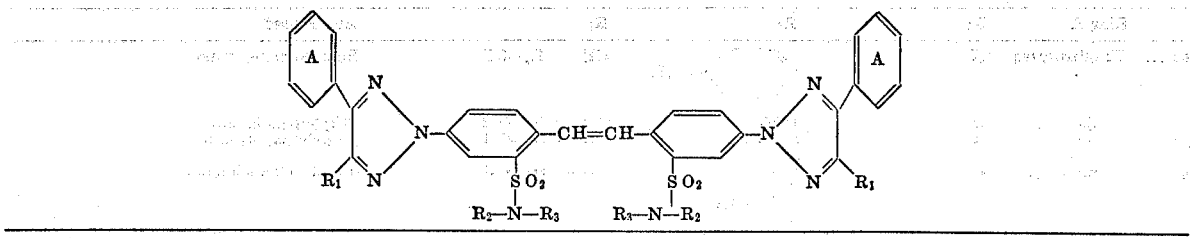

| | Ring A | $R_1$ | $R_2$ | $R_3$ | Amine used |
|---|---|---|---|---|---|
| a | Unsubstituted | H | $CH_3$ | $CH_2-CH_2OH$ | Methyl-ethanolamine. |
| b | do | H | $CH_3$ | $CH_2-CH_2OCH_3$ | Methyl-β-methoxyethyl-amine. |
| c | do | H | $CH_3$ | $CH_2-CH_2O-COCH_3$ | As a; subsequently acetylated (acetic anhydride). |
| d | do | H | $CH_3$ | $CH_2-CH_2O-COC_2H_5$ | As a; subsequently reacted with propionyl chloride. |
| e | do | H | $C_2H_5$ | $CH_2-CH_2-O-C_2H_5$ | Ethyl-β-ethoxyethyl-amine. |
| f | do | H | $CH_2-CH_2OH$ | $CH_2-CH_2OH$ | Diethanolamine. |
| g | do | H | $CH_2-CH_2-OCH_3$ | $CH_2-CH_2-OCH_3$ | Di-(β-methoxyethyl)-amine. |
| h | do | H | $CH_2-C_6H_5$ | $CH_2-CH_2-OCH_3$ | Benzyl-β-methoxyethyl-amine. |
| i | do | H | $C_6H_{11}$ | $CH_2-CH_2-OH$ | Cyclohexyl-β-hydroxyethylamine. |
| k | do | H | H | $CH_2-CH_2OH$ | Ethanolamine. |
| l | do | H | H | $CH_2-CH_2-OCH_3$ | β-Methoxyethylamine. |
| m | do | H | H | $(CH_2)_3-OCH_3$ | β-Methoxypropylamine. |
| n | do | H | H | $(CH_2)_3-OC_2H_5$ | β-Ethoxypropylamine. |
| o | do | H | H | $CH(CH_2OCH_3)(CH_3)$ | 1-methoxy-2-amino-propane. |
| p | do | H | H | $CH_2-CH(OH)-CH_3$ | 1-amino-propanol-(2). |
| q | do | H | $CH_2-CH(OH)-CH_3$ | $CH_2-CH(OH)-CH_3$ | Dipropanolamine. |
| r | do | H | $CH_3$ | $CH_2-CH(OH)-CH_3$ | Methyl-propanolamine. |
| s | do | H | H | $(CH_2)_3OH$ | Propanolamine. |
| t | do | H | \multicolumn{2}{morpholine} | Morpholine. |
| u | do | H | \multicolumn{2}{2,6-dimethylmorpholine} | 2,6-dimethylmorpholine. |
| v | do | $CH_3$ | $C_2H_5$ | $CH_2-CH_2-OH$ | Ethyl-ethanolamine. |
| w | do | $CH_3$ | \multicolumn{2}{2,6-dimethylmorpholine} | 2,6-dimethylmorpholine. |
| x | do | $CH_3$ | H | $CH_2-CH_2-OCH_3$ | Methoxyethylamine. |
| y | do | $C_2H_5$ | $CH_3$ | $CH_2-CH_2-OH$ | Methyl-ethanolamine. |
| z | do | $C_2H_5$ | \multicolumn{2}{2,6-dimethylmorpholine} | 2,6-dimethylmorpholine. |
| a1 | do | $CH(CH_3)_2$ | H | $CH_2-CH_2-OH$ | Ethanolamine. |
| b1 | do | n-$C_3H_7$ | $CH_3$ | $CH_2-CH_2-OH$ | Methylethanolamine. |
| c1 | do | n-$C_4H_9$ | $CH_3$ | $CH_2-CH_2-OH$ | Do. |
| d1 | do | $C_6H_5$ | $CH_3$ | $CH_2-CH_2-OH$ | Do. |
| e1 | do | $C_6H_5$ | \multicolumn{2}{2,6-dimethylmorpholine} | 2,6-dimethylmorpholine. |
| f1 | do | $C_6H_5$ | H | $(CH_2)_2OCH_3$ | Methoxyethylamine. |
| g1 | p-F | H | $CH_3$ | $CH_2-CH_2-OH$ | Methylethanolamine. |
| h1 | p-Cl | H | $CH_3$ | $CH_2-CH_2-OH$ | Do. |
| i1 | p-$CH_3$ | H | $CH_3$ | $CH_2-CH_2-OH$ | Do. |
| j1 | p-$CH_3$ | $CH_3$ | $CH_3$ | $CH_2-CH_2-OH$ | Do. |
| k1 | p-$CH_3$ | H | $CH_3$ | $CH_2-CH_2-OCH_3$ | Methyl-methoxyethylamine. |
| l1 | Unsubstituted | H | H | $CH_2-CH(OH)-C_2H_5$ | 1-amino-2-hydroxy-butane. |
| m1 | p-$OCH_3$ | H | $CH_3$ | $CH_2-CH_2-OH$ | Methylethanolamine. |

TABLE—Continued

| Ring A | R₁ | R₂ | R₃ | Amine used |
|---|---|---|---|---|
| n1 Unsubstituted | H | ⌬—CH₂— | CH₂—CH₂—OH | Benzylethanolamine. |
| o1 do | H | C₂H₅ | CH₂—CH₂—OH | Ethylethanolamine. |
| p1 do | H | n-C₃H₇ | CH₂—CH₂—OH | Propylethanolamine. |
| q1 do | H | CH₃—CH(CH₃)—CH₂— | CH₂—CH₂—OH | Isobutylethanolamine. |
| r1 do | ⌬—CH₂— | CH₃ | CH₂—CH₂—OH | Methylethanolamine. |
| s1 do | H | n-C₄H₉ | CH₂—CH₂—OH | Butylethanolamine. |
| t1 do | H | (CH₃)₂CH— | CH₂—CH₂—OH | Isopropyl-ethanolamine. |
| u1 do | H | CH₃O—CH₂—CH₂— | CH₂—CH₂—OH | Methoxyethyl-ethanolamine. |
| v1 do | H | CH₃ | CH₂—CH₂—O—CO—C₃H₇ | As a; subsequently reacted with butyric acid chloride. |

EXAMPLE 2

6 kg. of terephthalic acid dimethyl ester and 5 litres of ethylene glycol are mixed with 0.05% of zinc acetate and 0.03% of the brightener given under *a* in Example 1 (relative to terephthalic acid dimethyl ester) in a 20 litre stirred autoclave.

The autoclave is first heated to 180° C. whilst stirring. The trans-esterification starts at about 150° C.; the methanol eliminated is distilled off.

After one hour the temperature is raised to 200° C. and after a further 45 minutes it is raised to 220° C. The transesterification is complete after a total of 2¾ hours.

For pre-condensation, the product thus obtained is transferred, under nitrogen, into an autoclave heated to 275° C. During the pre-condensation the excess glycol is passed through a condenser and collected. After 45 minutes a slight vacuum is initially applied, and over the course of a further 45 minutes this is reduced to (below) 1 mm. Hg. After 2½ hours, the polycondensation is complete. The melt obtained is subsequently spun in a known manner into filaments of final gauge 50/25 den. The filaments obtained show an excellent brightening of high fastness to washing, chlorine and light.

Similar brightening effects are achieved if instead of the brightener used, one of the compounds corresponding to the formula I, of Example 1b–1 v1, is employed.

What is claimed is:

1. Stilbene compound of the formula

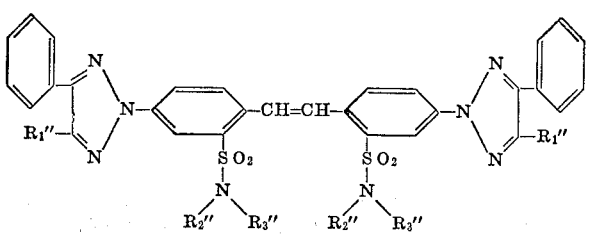

in which
  $R_1'$ represents hydrogen, alkyl, hydroxyalkyl, alkoxyalkyl, alkylcarbonyloxyalkyl, benzyl, phenyl, halophenyl, alkylphenyl, or alkoxyphenyl,
  $R_2'$ represents hydrogen, alkyl, hydroxyalkyl, alkoxyalkyl, alkylcarbonyloxyalkyl, or benzyl;
  $R_3'$ represents hydroxyalkyl; and
  $R_2'$ and $R_3'$ additionally can be joined together with the nitrogen atom to form an unsubstituted morpholine radical;
all alkyl and alkoxy radicals in the foregoing definitions having 1–4 carbon atoms.

2. Stilbene compound of the formula

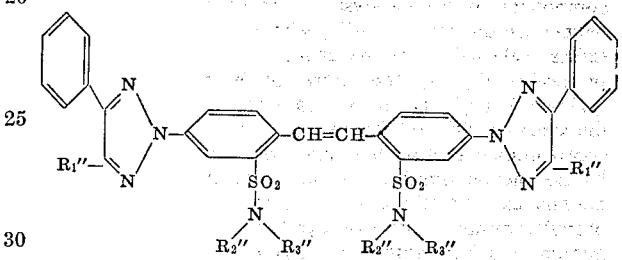

in which
  $R_1''$ represents hydrogen, methyl or ethyl,
  $R_2''$ denotes hydrogen, methyl, ethyl, n-propyl, n- and i-butyl, hydroxyethyl and methoxyethyl,
  $R_3''$ denotes hydroxyethyl or methoxyethyl, and
  $R_2''$ and $R_3''$ together with the N atom can form a morpholine or 2,6-dimethylmorpholine radical.

3.

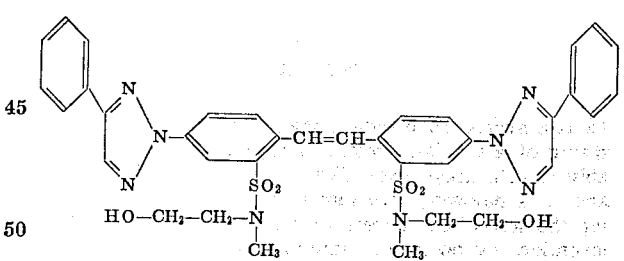

4.

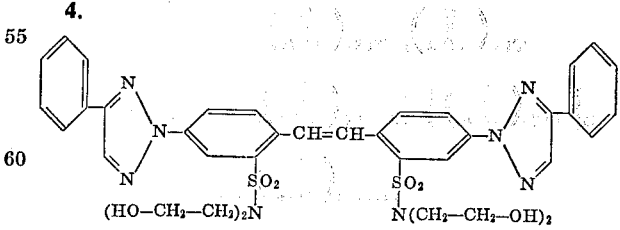

5.

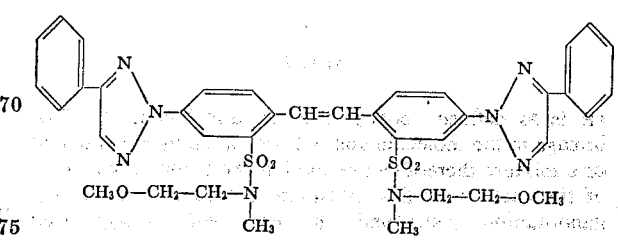

6.
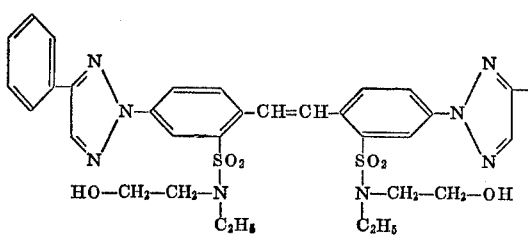
8.
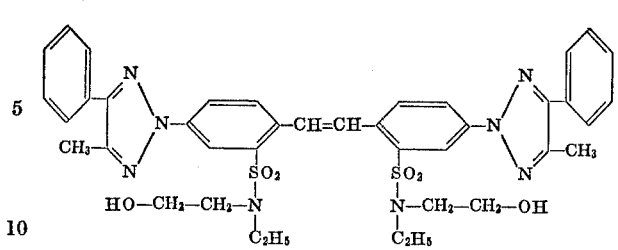
7.
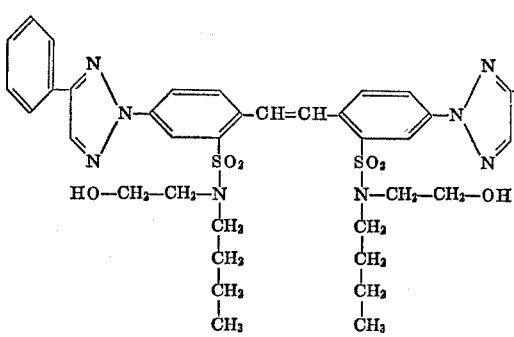
References Cited
UNITED STATES PATENTS
3,459,744   8/1969   Dorlars et al. ____ 260—240 CA
3,485,831   12/1969  Dorlars et al. ____ 260—240 CA
JOHN D. RANDOLPH, Primary Examiner
U.S. Cl. X.R.
106—176; 117—33.5 R, 33.5 T; 252—301.2 W, 543; 260—37 NP, 37 R, 40 P, 40 TN, 41 B; 240.1